US007920650B2

(12) United States Patent
Mudrak et al.

(10) Patent No.: US 7,920,650 B2
(45) Date of Patent: Apr. 5, 2011

(54) METHOD AND APPARATUS FOR EVALUATING A CLOCK IN A SATELLITE

(75) Inventors: Alexandre Mudrak, Gilching (DE); Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 723 days.

(21) Appl. No.: 11/936,472

(22) Filed: Nov. 7, 2007

(65) Prior Publication Data

US 2008/0152060 A1 Jun. 26, 2008

(30) Foreign Application Priority Data

Nov. 7, 2006 (DE) .................. 10 2006 052 681

(51) Int. Cl.
*H04L 27/00* (2006.01)
(52) U.S. Cl. ...................................... 375/316
(58) Field of Classification Search ............ 370/395.62, 370/507; 375/354, 355, 357, 358, 377, 316; 455/265; 702/89; 713/375, 400, 500, 600
See application file for complete search history.

(56) References Cited

U.S. PATENT DOCUMENTS

| 4,918,609 | A * | 4/1990 | Yamawaki | 701/207 |
|---|---|---|---|---|
| 5,506,781 | A * | 4/1996 | Cummiskey et al. | 701/226 |
| 6,373,432 | B1 * | 4/2002 | Rabinowitz et al. | 342/357.16 |
| 2005/0089128 | A1 * | 4/2005 | McReynolds | 375/354 |
| 2007/0279279 | A1 * | 12/2007 | Meyers et al. | 342/357.02 |

OTHER PUBLICATIONS

Jorgensen, P.S., "Obtaining the short term stability of the GPS satellite clocks from tracking data", Institute of Navigation, National Technical meeting, San Diego, CA, Jan. 17-19, 1984, Proceedings (A85-38526 17-04), Washington, D.C. Institutes of Navigation, 1984, pp. 235-239.
Kristine M. Larson et al., "Carrier-Phase time Transfer", IEEE Transactions on Ultrasonics, Ferroelectrics, And Frequency Control, vol. 46, No. 4, Jul. 1999, pp. 1001-1012, ISSN: 0885-3010.
Jay Oaks et al., "Comparative Analysis of GPS Clock Performance Using Both Code-Phase and Carrier-Derived Pseudorange Observations", Proceedings of the $36^{th}$ Annual Precise Time and Time Interval Systems and Applications Meeting, Dec. 7-9, 2004, pp. 431-440.
P. Daly et al., "Characterization of NAVSTAR GPS and Glonass On-Board Clocks", Aerospace and Electric Systems magazine, IEEE, vol. 5, Issue 7, Jul. 1990, pp. 3-9, ISSN: 0885-8985.
Thomas B. McCaskill, "Analysis Of The Frequency Stability History of GPS Navstar Clocks", Proceedings of the 1997 IEEE international Frequency Control Symposium, May 28-30, 1997, pp. 295-303, ISBN: 0-7803-3728-X.

* cited by examiner

*Primary Examiner* — Sam K Ahn
(74) *Attorney, Agent, or Firm* — Crowell & Moring LLP

(57) ABSTRACT

In a system for characterizing a satellite clock in a satellite, the satellite has a transmitting device that emits a transmission signal at a transmission frequency indicative of a state of the satellite clock, and a receiver clock which has a higher precision than the satellite clock. A receiving device is configured to receive the transmission signal and to determine a received signal therefrom, as well as a received signal frequency and/or phase, using the receiver clock. Finally, an evaluation device is configured to determine a frequency offset, drift, and/or an Allan deviation of the transmission frequency from the received signal frequency and/or the received signal phase. The evaluation device determines the stability of the satellite clock, or the validity of its time indication, from the determined frequency offset, frequency drift, and/or the Allan deviation, to thereby characterize the satellite clock.

10 Claims, 4 Drawing Sheets

METHOD AND APPARATUS FOR EVALUATING A CLOCK IN A SATELLITE

The present invention relates to a system for characterizing stability of a clock in a satellite.

Heretofore, delay time differences (rather than frequency) have been used to evaluate and characterize the stability of a clock in a satellite. In However, use of this technique causes substantial orbiting errors and signal processing errors to be included in the measurement or estimation, especially because when a satellite is not situated in a precisely defined position, the delay times cannot be assigned unambiguously. If the satellite moves substantially in its orbit during the measurement, the evaluation signal may arrive at a receiver in a time-delayed manner when the position of the satellite is not precisely known. Thus, only a very imprecise estimate of the stability of the clock can be achieved from an evaluation signal containing information concerning this clock, such as the time of day of the clock.

It is therefore an object of the present invention, to provide an evaluation method and apparatus that achieves a more precise determination of the stability of a clock in a satellite.

This and other objects and advantages are achieved by the method and apparatus according to the invention for evaluating a satellite clock in a satellite that has a transmitting device which emits a transmission signal at a transmission frequency as a function of a state of the satellite clock. In addition, the apparatus according to the invention also includes a receiver clock which has a higher precision than the satellite clock. A receiving device receives the transmission signal, determines a received signal therefrom, and determines from the received signal a received signal frequency and/or a received signal phase by using the receiver clock. An evaluation device determines a frequency offset, a frequency drift and/or an Allan deviation (abbreviated as "ADEV" herein) of the transmission frequency from the received signal frequency and/or the received signal phase. It also determines the stability of the satellite clock or the validity of the time indication of the satellite clock from the determined frequency offset, the frequency drift and/or the Allan deviation, to evaluated the satellite clock.

Furthermore, the present invention provides a method of characterizing a satellite clock in a satellite such as described above, using a ground unit having a receiver clock with a higher precision than the satellite clock. The method includes the following steps:

receiving the transmission signal;

determining a received signal therefrom;

using the receiver clock to determine a received signal frequency and/or a received signal phase from the received signal;

evaluating the received signal to determine a frequency offset, a frequency drift and/or an Allan deviation (ADEV) of the transmission frequency from the received signal frequency and/or the received signal phase, and determining the stability of the operation of the satellite clock or the validity of a time indication of the satellite clock from the determined frequency offset, frequency drift and/or Allan deviation (ADEV), to evaluate the satellite clock.

The present invention is based on the recognition that a signal emitted by the satellite, which comprises information concerning a clock in a satellite, takes place as a result of the evaluation of the frequency of this signal emitted by the satellite. In this manner it is possible to avoid including in the calculation the significant errors which result from using delay time differences while the trajectory of the satellite is unknown, and which cause the evaluation of the clock to be performed only very imprecisely. According to the invention, when evaluating the frequency of the signal emitted by the satellite, particularly a frequency offset and/or a frequency drift of the transmission signal can be determined. If, for example, the frequency of the transmission signal is known, the speed of the satellite can be determined from the received frequency of the transmission signal, even if the position in the orbit is uncertain. Thus, for example, when the information concerning the clock of the satellite is frequency modulated onto the transmission signal, the information concerning the clock of the satellite can be reconstructed in the receiver by a simple evaluation of the frequency offset. Stability of the satellite clock can also be determined, for example, by evaluating frequency drift.

Relative to the state of the art, therefore, the present invention has the advantage of avoiding the use of delay time differences when measuring or estimating the stability of a clock in one of the satellites. The invention is therefore particularly advantageous when the trajectory of the satellite is not known precisely.

According to an embodiment of the invention, the evaluation device can be configured to correct errors that occur in the received signal frequency or the received signal phase because of relativistic effects, based on precalculated orbit data of the satellite. This permits a further refinement of the estimation possibility of the stability of the clock in the satellite because knowledge of the orbit data of the satellite already exists, so that the known data can be used to improve the estimated value.

To improve further the evaluation of satellite clock stability, the evaluation device according to the invention can be constructed to compensate for an ionospheric error in the signal transmission path between the satellite and the system, by using a precalculated ionosphere compensation model in determining the frequency offset and/or the frequency drift from the received signal frequency or the received signal path. In this case, known atmosphere-physical models of the ionosphere can be used to improve further the estimated value of clock stability, since an error occurring in the received signal can be simulated beforehand by a model known, and can then be compensated from the received signal.

According to a further embodiment of the invention, the satellite may be configured to emit a reference signal which has a frequency that differs from a frequency of the transmission signal. In this case, the transmission device can be constructed to receive the reference signal with the reference frequency while the evaluation device is constructed to determine an error correction term with respect to an ionospheric error in the signal transmission path between the satellite and the system by comparing the frequency of the received signal and the reference frequency of the reference signal. The evaluation unit can then use the determined error correction term to determine the frequency offset or the frequency drift. For this purpose, for example, discontinuities occurring in the ionosphere are measured by two electromagnetic rays which have a different frequency. For example, the satellite may emit another electromagnetic signal of a frequency different from the transmission signal. A receiver can then receive the transmission signal as well as the additional electromagnetic signal and, based on knowledge of the respective transmission frequencies, can form an up-to-date model of the ionosphere. The latter can then be used to compensate for errors in the transmission signal.

According to an embodiment of the invention, the evaluation device can be constructed to compensate a tropospheric error in the signal transmission path between the satellite and the system by using a precalculated tropospheric compensation model during the determination of the frequency offset and/or the frequency drift from the received signal frequency or the received signal phase. This feature of the invention permits the correction of errors resulting from tropospheric discontinuities, for example, using known meteorological models of the troposphere. Thus, a further improvement of the estimation precision of the clock in the satellite can be achieved simply by taking into account models originating from other scientific fields.

According to another embodiment of the invention, the system can be constructed to evaluate the satellite clock in a time period of at least three hours, ensuring that the measurement is carried out over a sufficiently long time period, such that reliable information can be obtained concerning the stability of the satellite clock.

In particular, according to an embodiment of the invention, the receiver clock may have an active H maser, which represents a particularly frequency-stable clock. It may also be synchronized by means of an international time reference standard, achieving a further increase in precision and a highly precise estimate of the stability of the satellite clock, even in other parts of the globe.

Other objects, advantages and novel features of the present invention will become apparent from the following detailed description of the invention when considered in conjunction with the accompanying drawings.

DETAILED DESCRIPTION OF THE DRAWINGS

In the following, identical or functionally identical elements may be provided with the same reference numbers. The absolute values and measurements indicated below are provided only as examples, and do not limit the invention.

Figure 1:
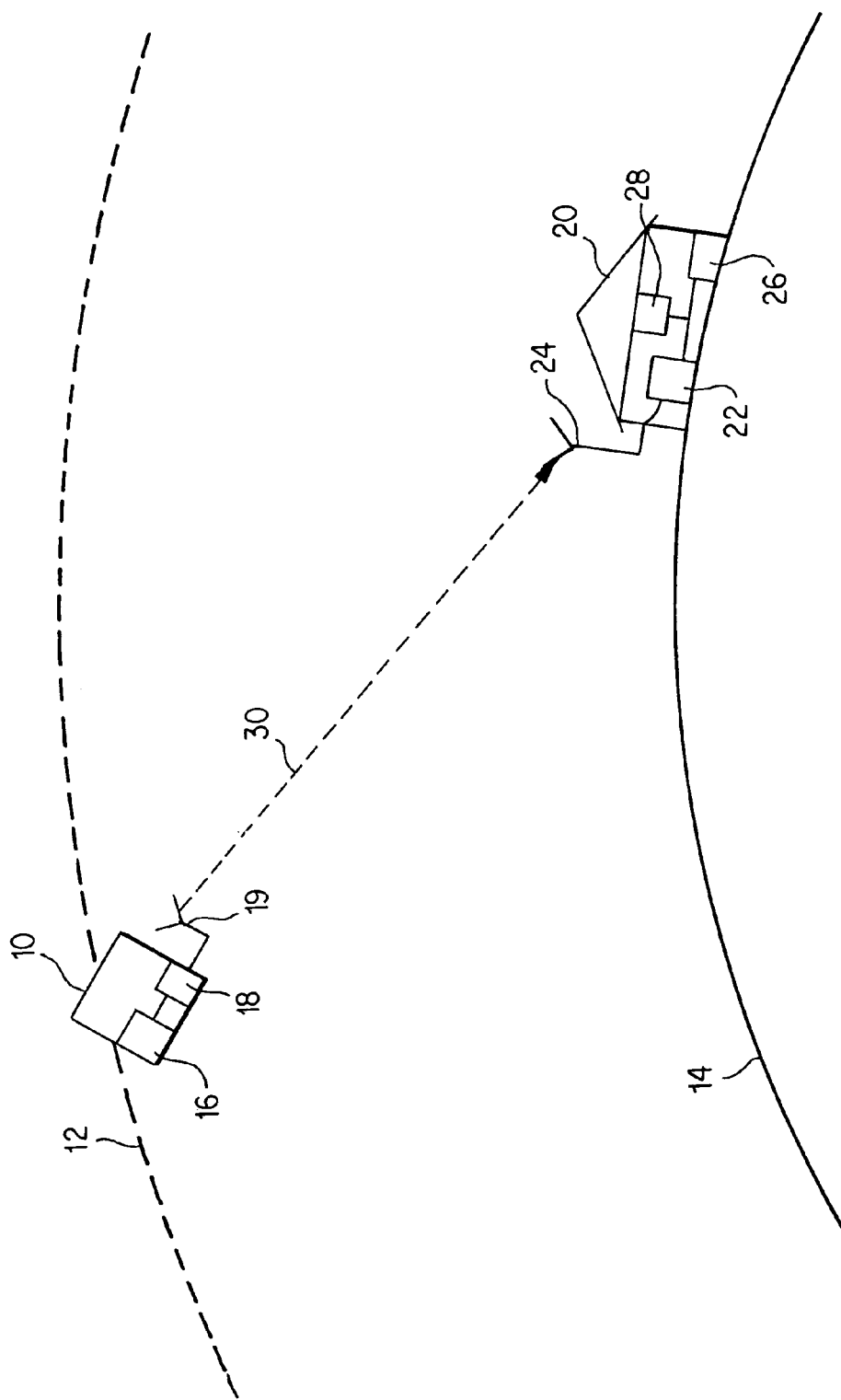
FIG. 1 is a schematic representation of an embodiment of the present invention.

FIG. 1 is a schematic representation of an embodiment of the present invention, including a satellite 10 which orbits the earth 14 on a trajectory 12, and has a satellite clock 16 connected with a transmission device 18 having an antenna 19. A receiving station 20, which is situated on the ground 14, has a receiving device 22 with an antenna 24, and an evaluation device 26 connected with the receiving device 22. In addition, the receiving station 20 comprises a receiver clock 28 which is connected to both the receiving device 22, and with the evaluation device 26. The receiver clock 28 preferably has a higher precision than the transmission clock 16. The receiver clock 28 may, for example, have an active H maser which has high frequency stability.

On its trajectory through the orbit, the satellite 10 can send transmission signals 30 from its antenna 19 to the antenna 24 of the receiving station 20, and can modulate (for example by frequency modulation) information of the satellite clock 16 (such as the time of day of the satellite clock 16) onto the transmission signal 30. The information of the satellite clock 16 can be recovered in the receiving device 22 or the evaluation device 26 can be recovered from the frequency of the transmission signal 30 into the receiving station 20. A signal of the receiver clock 28, which has a higher precision than the satellite clock 16, can preferably be used as a reference for this purpose. In this case, the reference supplied by the receiver clock 28 can be used for very precisely determining the stability of the satellite clock. Simultaneously, for example, the current time of day of the satellite clock 16 can also be read out in the receiving station 20.

Such an arrangement makes it possible to implement an additional characterization test for a satellite clock in an experimentation program, such as a GSTB-V2 (Galileo System Test Bed Version 2). This test consists of the characterization of the primary satellite clock (including relative frequency instability with respect to Allan deviations, frequency offset and frequency drift with respect to TAI, TAI=Time Atomic International), using a carrier frequency measurement of transmission signals by the satellite clock, which signals are received in a receiving station on the ground. The station is preferably equipped with a stable atomic clock (for example, an active H maser) and preferably has a connection to TAI.

The objects of the embodiment of the present invention, that is, of the test case, can be described as follows:

Estimation of the short-time stability of the satellite clock:

Short-time stability is a fundamental factor for the implementation of a navigation (with respect to the renewal rate of the satellite clock prediction model within the navigation information), in order to keep the time model error contribution to the total error UERE (UERE=User Equivalent Range Error) within the specified system demand.

Estimation of the medium-time and long-time stability and drift of the satellite clock:

The requirement for recalibrating an atomic clock essentially depends on the long-time stability. As a result, characterizing the satellite clock is important for maintaining the system operation.

Both objects of the test should be achieved as early as possible in order to gain knowledge concerning the efficiency of the primary satellite clock onboard, for example, the Galileo system. This permits an evaluation of the contribution of the satellite clock to the overall error budget (for example, of the Galileo system) in an earlier phase of the system development and also permits an intervention of countermeasures during the IOV phase in the event that deviations are discovered.

It is assumed that the additional characterization test (referred to previously) checks the efficiency of a secondary clock by utilizing phase difference measurements between the primary and the secondary clocks. Since such a test relates to the relative behavior of the clock and essentially to the secondary clock, the determination of the behavior of the primary clock(s) is considered to be of paramount significance.

The present invention provides an innovative test for analyzing the efficiency of, for example, GSTB-V2 onboard clocks by a determination of the frequency of the satellite signal which is received on the ground and is compared with a precise atomic clock. In this case, the term "precise" relates to the onboard clock (that is, to the satellite clock). For example, an active H maser may be such a precise atomic clock on the ground.

A first test of the method according to the invention for characterizing a clock was carried out by using GPS observations.

The use of signal in space ("SIS") or transmission signal carrier frequency measurements to characterize the satellite clock has the advantage that the signal transit time during the propagation need not be taken into account, including hardware decelerations, which represent a critical point with respect to the stability of a GSTB-V2 receiver (that is, the receiving station 20, as it is illustrated in FIG. 1). Only changes of the signal transit time during individual frequency measurements need be taken into account, because the points in time for the individual frequency measurements can be made very brief.

To carry out correctly frequency measurements for a satellite clock characterization, the Doppler shift due to the movement of the satellite must be taken into account. For this purpose, for example, certain requirements with respect to the precision of the GSTB-V2 satellite ephemeris should be met. However, this requirement is not very strong (approximately 1-2 m (95%) after the signal processing).

In a first approximation, propagation effects in the ionosphere do not affect the frequency of the received signal. However, the frequency measurements should not be corrected by non-linear ionospheric effects where these effects are most visible, in order to permit a characterization of the satellite clocks by average intervals of several hours to one day. Such a correction can take place by the use of ionospheric maps, as produced by the DLR (German Aerospace Center). As an alternative, products of the International GPS Service can be used. When 2-frequency measurements are available, a so-called "ionosphere-free" measurement combination can finally be calculated.

For current GPS observations, the inherent measurement interference level expressed in the form of Allan deviations amounts to approximately $1*10^{-11}$ (in the case of one second) for frequency measurements (calculated from GPS carrier phase data) and approximately $3*10^{-10}$ to $1*10^{-9}$ for the pseudo distance measurements (signal transit time delay); that is, the precision of the phase measurements is at least 30 times better than the pseudo distance measurements.

This measuring method can be implemented by utilizing the frequency (Doppler) and/or carrier phase measurements of a Galileo SIS. The GSTB-V2 TUR (TUR=Test User Receiver) should therefore permit these types of measurements. Additionally, the receiving station, that is, the TUR, should be supplied with frequency signals of a clock on the ground, in which case the clock on the ground should be more frequency-stable than that in the satellite (the onboard clock). The clock on the ground may, for example, be an active H maser. In order to reduce the effects on the experimental results of a possible long-time frequency drift of the clock on the ground, the latter can be controlled by the International Time Standard TAI/UTC (UTC=Universal Time Coordinated). Such control is also required for characterizing the frequency precision and the frequency drift of the satellite clock with respect to the International Time Standard, that is, the TAI/UTC.

The frequency measurements and the differentiated carrier phase measurements are influenced only by temporary variations of the SIS transit time delays, receiver delays and orbit determination errors. In addition, the TUR measurement interference level in the carrier phase measurements and the multipath propagation error therein is ten times lower than in the case of the pseudo distance measurement. For this reason, a combination of SIS carrier phase measurements and SIS carrier frequency measurements is perfectly suitable for a satellite clock characterization.

Because of the availability of the necessary infrastructure and of additional products (such as the ionospheric maps and the meteorological data), a series of measurements in devices of the DLR in Oberpfaffenhofen appears to be an economical and direct solution. The GSTB-V2-TUR (which is connected to an active H maser in the time lab of the DLR) itself can be considered to be sufficiently suitable for operating as a frequency sensor.

Figure 2:
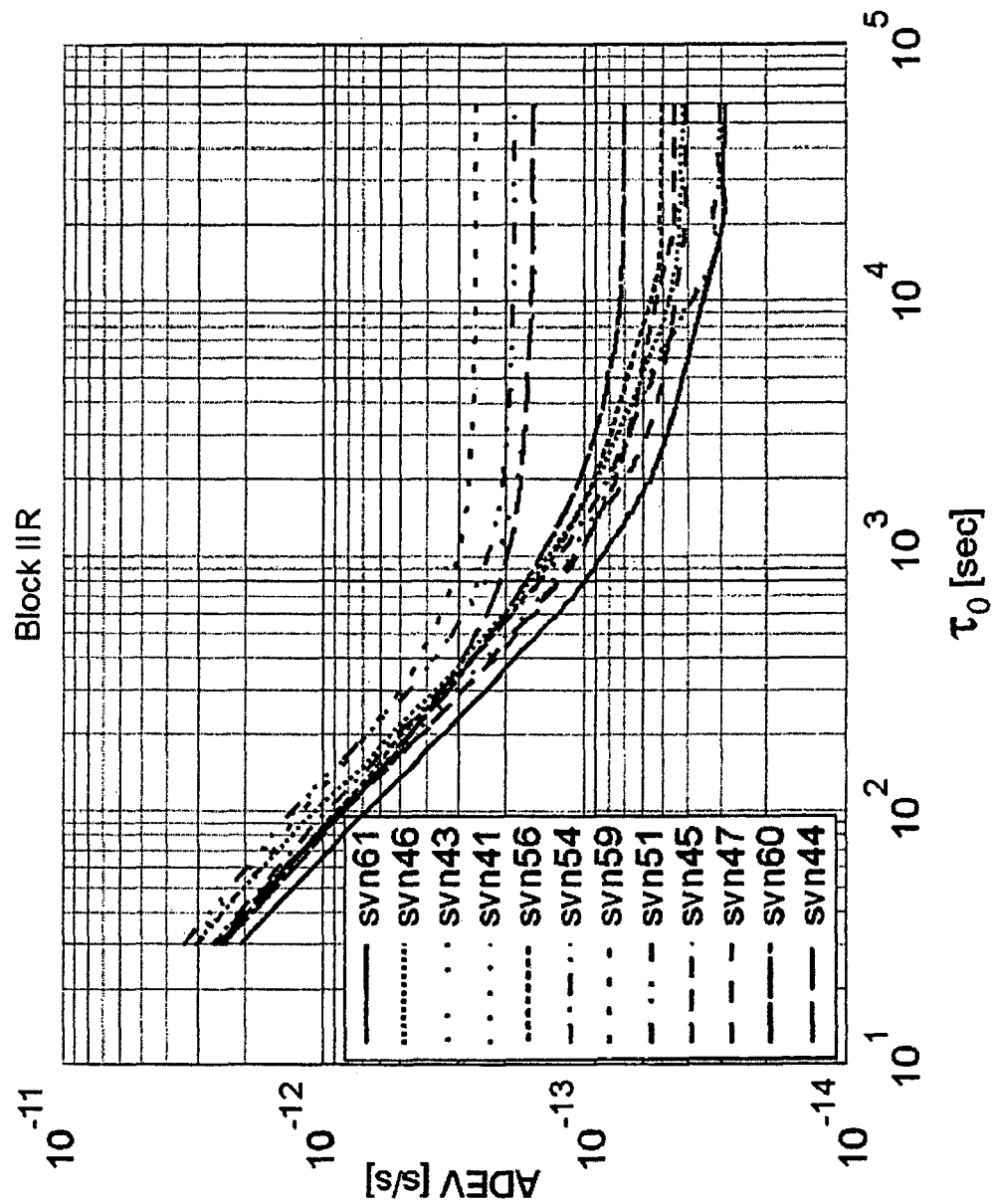
FIG. 2 shows a characterization of a relative frequency stability of a satellite clock.

FIG. 2 represents the characteristic of GPS satellite clocks in the form of an Allan deviation (ADEV), which was obtained by the approach according to the invention. The necessary Doppler and carrier phase measurements were received by means of a 2-frequency GPS receiver which is installed in the time lab of the DLR in Oberpfaffenhofen. FIG. 2 therefore shows an example of a characterization of the relative frequency stability of a satellite clock when using GPS carrier phase measurements by means of different courses of curves called svn.

A number of assumptions with respect to the calculation can be made, which significantly facilitate estimation of the stability of a satellite clock.

First it can be assumed that a phase estimation and/or frequency estimation can be calculated in that data are continuously collected for approximate 3 to 4 hours. The measurements should be repeated for obtaining 20 to 30 data sets in order to be able to build up a representative statistical data file. For this reason, the recommended duration of a series of measurements is approximately four weeks. For this purpose, it is assumed, therefore, that the GSTB-V2 satellite is visible for the above-mentioned time period at a clear elevation angle from the ground station in Southern Germany.

It can also be assumed that the TUR can be controlled by an external time reference (one pulse per second) and frequency reference (5 or 10 MHz).

Finally it can be assumed that the TUR should be capable of carrying out the GSTB-V2 carrier phase and/or frequency measurements (preferably both) and of emitting their results.

However, in principle, limitations of the approach according to the invention should also be mentioned. In particular, a low degree of precision of the results of an offline ODTS (ODTS=orbit determination and time synchronization) of the GSTB-V2 satellites may worsen all test results. In this case, the integration of a laser distance measuring unit (for determining the position of the satellite) may be taken into account (which, however, would cause additional costs).

Data of the ODTS process may be considered to be accessible to an OSPF routine operation (OSPF=orthography and synchronization processing facility). No specific interfaces to other testing environments are required. However, an exchange of early test results between this test and the test for the secondary clock determination is desirable.

The following approach can be taken for implementing an embodiment of the present invention:

First, the carrier phase and the frequency of a receiving GSTB-V2 SIS can be measured with respect to an active H maser in the receiving station (that is, on the ground).

Second, a correction of the measured SIS phase and frequency by relativistic effects can take place, in which case, for example, precise orbits are used which were calculated by the OSPF. Changes in the propagation medium, which occur during the measuring time, can also be corrected. In this case, an ionospheric error can be compensated by the utilizing a corresponding model or by a 2-frequency Galileo measurement (if available). A tropospheric error can also be compensated, using a corresponding model.

Third, the Allan deviations can be calculated from the corrected SIS phase and frequency data in order to check the short-time and medium-time frequency instability of the primary satellite clock.

Fourth, the frequency offset and drift of the primary satellite clock can be calculated using the corrected data, in order to verify the clock.

The approach according to the invention can preferably take place by using the following data and devices:

A corresponding receiver (TUR) which preferably utilizes the frequency and the one pulse per second signal of the reference clock of the receiving station on the ground and emits the frequency and the phase of the received transmission signal (GSTB-V2 SIS) of the satellite clock.

An ephemeris with a precision of better than 2 m (95%) after a signal processing;

a number of predetermined requirements (for example, in the form of a requirement catalogue) for characterizing the primary satellite clock;

time schedules for the series of measurements;

requirements with respect to the device of the TUR and of the data interface; and test results concerning internal error sources of the TUR.

In order to carry out the above-described clock characterization test successfully, the following elements are required which are obtained, for example, from the Galileo infrastructure:

A functional satellite (such as a GSTB-V2 satellite); and an operative OSPF unit which can provide orbits with a precision of at least 2 m (95%).

In order to be able to carry out the test scenario, different devices can be used in this case, such as a tropospheric model;

an ionospheric model or 2-frequency measurements;

a device for correcting the signal measurements with respect to relativistic effects and propagation effects;

a device for calculating the Allan deviation (ADEV) from the frequency measurements; and a device for calculating the frequency offset and the frequency drift which represents a part of the clock model to be checked by means of the frequency data.

Figure 3:
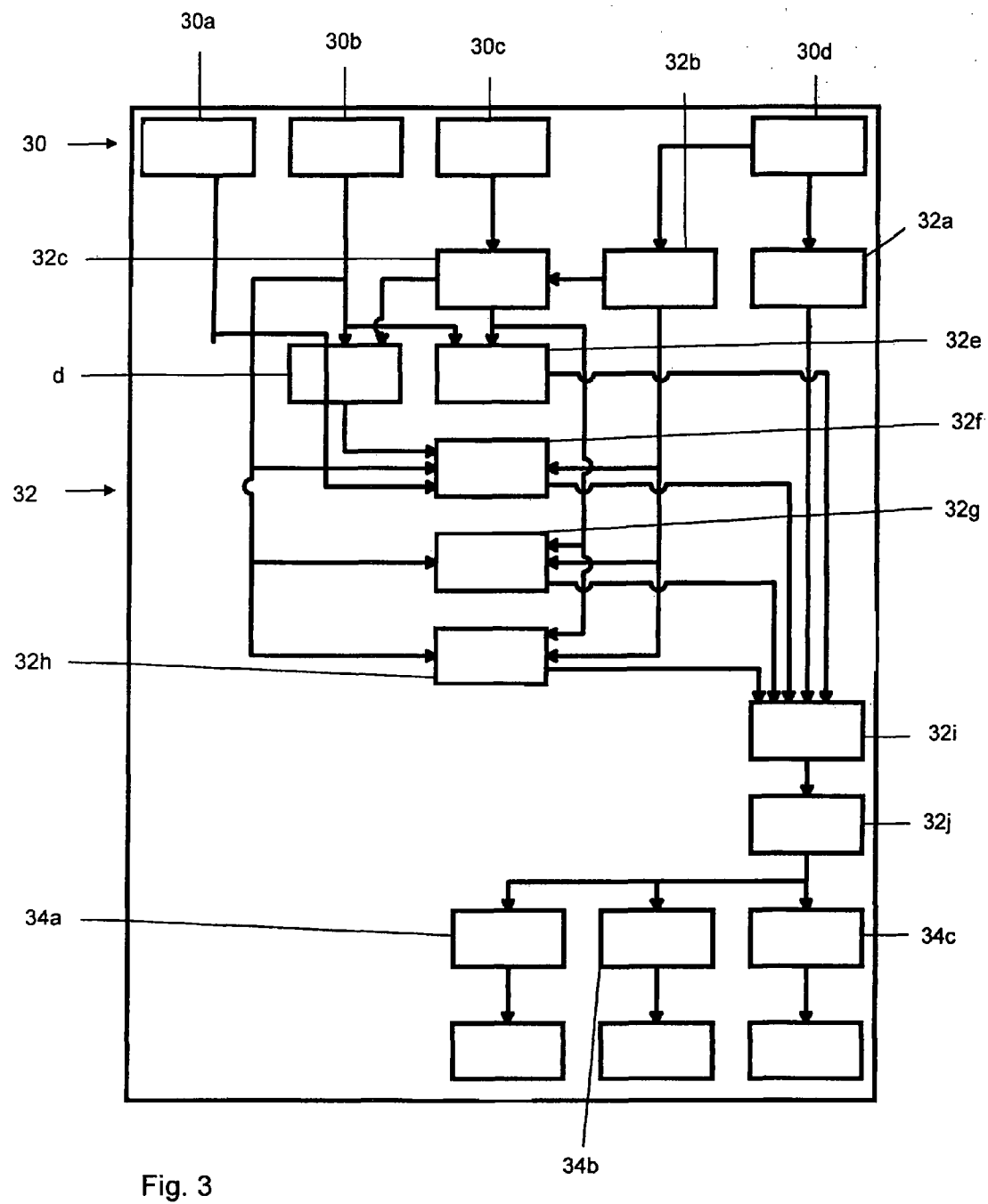
FIG. 3 is a diagram of an embodiment of the method according to the invention.

FIG. 3 illustrates an embodiment of the method according to the invention. Here, input data 30 are provided to the process. The input data may comprise a tropospheric delay 30a, a position of the ground station 30b, an ephemeris of the satellite and a count of a counter of the satellite clock 30c as well as pseudo distance measurements and phase measurements 30d. From these input data 30, by means of the linkages illustrated in FIG. 3, various intermediate results 32 are then computed, such as an ionosphere-free combination 32a, measurement time stamps 32b, a satellite position and a satellite clock offset 32c, a satellite elevation and a corresponding azimuth 32d, a distance between the receiver and the satellite 32e, an ionospheric correction 32f, a relativistic correction 32g, a Sagnac correction 32h, a corrected phase 32i deep as well as cycle slip recognition value and a repair of the cycle slip 32j. From these intermediate results, a frequency offset 34a, a frequency 34b and/or an Allan deviation 34c can be calculated.

Figure 4:
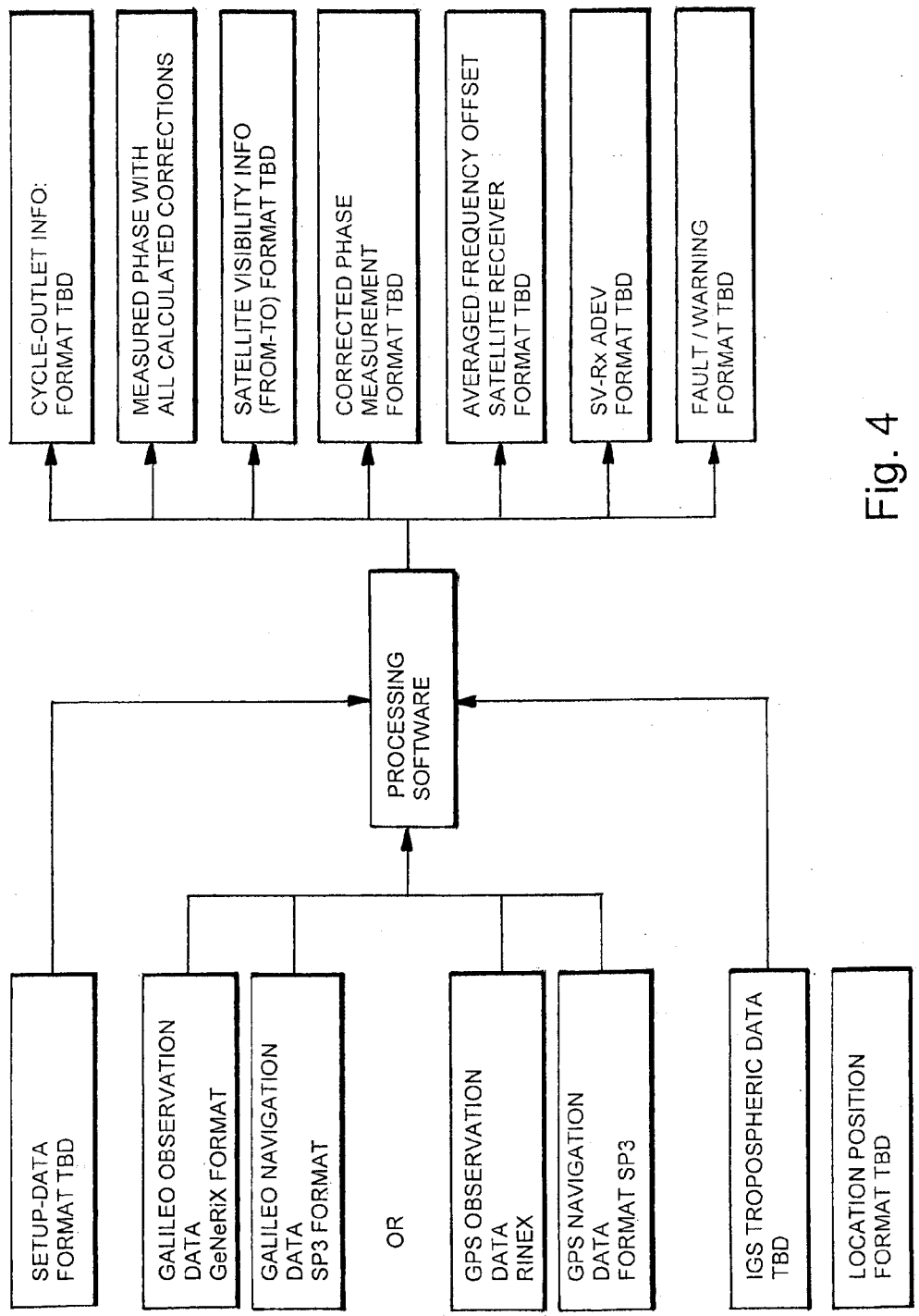
FIG. 4 shows input data for processing and of the resulting output data according to an embodiment of the present invention.

FIG. 4 illustrates a further embodiment of input data and output data computed therefrom.

Depending on the circumstances, the method according to the invention can be implemented in hardware without software. The implementation can take place on a digital storage medium, particularly a diskette or CD by means of a control signal which can be read out electronically and which thereby can interact with programmable computer systems, so that the corresponding method is implemented. In general, the invention therefore also consists of a computer program product having a program code stored on a machine-readable carrier, for implementing the method according to the invention when the computer program product is running on a computer. In other words, the invention can thereby be implemented as a computer program by means of a program code for carrying out the method when the computer program is running on a computer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMBERS

10 Satellite
12 trajectory, orbit
14 earth, ground
16 satellite clock
18 transmission device
19 antenna
20 receiving station
22 receiving device
24 antenna
26 evaluation device
28 receiver clock
30 input data
30a tropospheric delay
30b position of the ground station
30c ephemeris of the satellite and a count of a counter of the satellite clock
30d pseudo distance measurements and phase measurements
32a ionosphere-free combination
32b measurement time stamp
32c satellite position and satellite clock offset
32d satellite elevation and a corresponding azimuth
32e distance between receiver and satellite
32f ionospheric correction
32g relativistic correction
32h Sagnac correction
32i corrected phase
32j cycle slip recognition value and repair of the cycle slip
34a frequency offset
34b frequency
34c Allan deviation

What is claimed is:

1. A system for characterizing stability of a satellite clock in a satellite having a transmitting device that is configured to emit a transmission signal at a transmission frequency that is a function of a state of the satellite clock; the system comprising:

a receiver clock which has a precision greater than precision of the satellite clock;

a receiving device which is configured to receive the transmission signal, determine a received signal therefrom, and determine from the received signal at least one of a received signal frequency and a received signal phase by using the receiver clock; and an evaluation device which is configured to determine at least one of a frequency offset, a frequency drift and an Allan deviation of the transmission frequency from at least one of the received signal frequency and/or the received signal phase, and to determine one of the stability of the satellite clock and validity of the time indication of the satellite clock, based on at least one of the determined offset, the determined drift and the determined Allan deviation, thereby characterizing the satellite clock.

2. The system according to claim 1, wherein the evaluation device is configured to correct errors occurring in the received signal frequency or phase as a result of relativistic effects, based on precalculated orbit data of the satellite.

3. The system according to claim 1, wherein, for determining the frequency offset drift from the received signal frequency or phase, the evaluation device is configured to compensate an ionospheric error in the signal transmission path between the satellite and the system based on a precalculated ionosphere compensation model.

4. The system according to claim 1, wherein:
the satellite is configured to emit a reference signal that has a reference frequency which differs from a frequency of the transmission signal;
the transmission device is configured to receive the reference signal with the reference frequency;
the evaluation device is further configured to determine an error correction term with respect to an ionospheric error in the signal transmission path between the satellite and the system, by comparing the frequency of the received signal with a reference frequency of the reference signal, and to use the determined error correction term to determine the frequency offset or drift.

5. The system according to claim 1, wherein for determining the frequency offset or drift from the received signal frequency or phase, the evaluation device is configured to compensate a troposheric error in the signal transmission path between the satellite and the system based on a precalculated troposhere compensation model.

6. The system according to claim 1, wherein the system is configured to implement a characterization of the satellite clock during a time period of at least three hours.

7. The system according to claim 1, wherein the receiver clock comprises an active H maser.

8. The system according to claim 2, wherein the receiver clock is synchronized by means of an International Time Reference Standard.

9. A method of characterizing stability of a satellite clock in a satellite having a transmission device that emits a transmission signal at a transmission frequency that is a function of a state of the satellite clock; the method comprising:
receiving the transmission signal and determining a received signal therefrom;
determining at least one of a received signal frequency and a received signal phase from the received signal, using a receiver clock which has a greater precision then the satellite clock; and
evaluating the received signal to determine at least one of a frequency offset, a frequency drift, and an Allan deviation of the transmission frequency from at least one of the received signal frequency and the received signal phase; and
determining one of the stability of the satellite clock and validity of a time indication of the satellite clock, based on the determined frequency offset, the determined frequency drift or the determined Allan deviation, thereby characterizing the stability of the satellite clock.

10. A non-transitory computer readable medium encoded with a program for causing a computer to perform the method according to claim 9.

* * * * *